(12) United States Patent
Geier et al.

(10) Patent No.: US 10,607,430 B2
(45) Date of Patent: Mar. 31, 2020

(54) METHOD FOR OPERATING A START AND ENTRY SYSTEM OF A MOTOR VEHICLE AND START AND ENTRY SYSTEM FOR A MOTOR VEHICLE

(71) Applicant: AUDI AG, Ingolstadt (DE)

(72) Inventors: Tobias Geier, Dachau (DE); Erik Friebe, Oberdolling (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/322,628

(22) PCT Filed: Jun. 21, 2017

(86) PCT No.: PCT/EP2017/065270
§ 371 (c)(1),
(2) Date: Feb. 1, 2019

(87) PCT Pub. No.: WO2018/024399
PCT Pub. Date: Feb. 8, 2018

(65) Prior Publication Data
US 2019/0340857 A1 Nov. 7, 2019

(30) Foreign Application Priority Data
Aug. 3, 2016 (DE) .......... 10 2016 214 365

(51) Int. Cl.
*G08C 17/00* (2006.01)
*B60R 25/10* (2013.01)
(Continued)

(52) U.S. Cl.
CPC ........ *G07C 9/00309* (2013.01); *B60R 25/209* (2013.01); *B60R 25/241* (2013.01);
(Continued)

(58) Field of Classification Search
CPC ... B60R 25/24; B60R 2325/205; B60R 16/03; B60R 2325/20; B60R 25/00;
(Continued)

(56) References Cited

U.S. PATENT DOCUMENTS

2011/0068895 A1 3/2011 Gee et al.
2013/0179005 A1 7/2013 Nishimoto et al.
(Continued)

FOREIGN PATENT DOCUMENTS

CN 104245389 A 12/2014
CN 205186085 U 4/2016
(Continued)

OTHER PUBLICATIONS

English-language translation of international preliminary report on patentability dated Feb. 14, 2019 in corresponding International Application No. PCT/EP2017/065270; 8 pages.
(Continued)

*Primary Examiner* — Dionne Pendleton
(74) *Attorney, Agent, or Firm* — Maier & Maier, PLLC

(57) ABSTRACT

A method for operating a start and entry system of a motor vehicle, including the steps of: detecting whether an authorization of the starting of the motor vehicle is carried out on the basis of a key signal received on the vehicle side, which has been sent from a transmitting and receiving unit of a vehicle key, or whether the authorization of the starting of the vehicle is carried out on the basis of a near-field signal received on the vehicle side, which has been sent by a near-field communication system of a mobile communication device. If the authorization of the vehicle start is carried out on the basis of the key signal received on the vehicle side: the start and entry system is operated in a key operating
(Continued)

mode, in which, following the starting of the vehicle, only the availability of the vehicle key in a vehicle interior of the motor vehicle is monitored.

8 Claims, 2 Drawing Sheets

(51) Int. Cl.
*G07C 9/00* (2020.01)
*B60R 25/24* (2013.01)
*B60R 25/20* (2013.01)

(52) U.S. Cl.
CPC .................. *B60R 2325/103* (2013.01); *G07C 2009/00325* (2013.01); *G07C 2009/00547* (2013.01); *G07C 2209/63* (2013.01); *G07C 2209/64* (2013.01); *G08C 2201/93* (2013.01)

(58) Field of Classification Search
CPC ............... B60R 25/04; B60R 25/1001; B60R 2325/101; B60R 25/245; B60R 16/02; B60R 2325/10; B60R 25/01; B60R 25/20; B60R 25/2018; B60R 25/209; B60R 25/243; B60R 25/248; B60R 25/305; G07C 9/00309; G07C 2009/00793; G07C 2009/00865; G07C 2209/63; G07C 9/00007; G07C 2009/00547; G07C 9/00; G07C 2009/00476; G07C 2009/00555; G07C 2009/00769; G07C 2009/0088; G07C 9/00571; G07C 9/21; G07C 9/22; G07C 9/253; G07C 9/00857; G07C 9/20; G07C 2009/00206; G07C 2009/00317; G07C 2009/00365; G07C 2009/00587; G07C 2009/00984; G07C 9/00182; G07C 9/00563; B60K 2028/006; B60K 28/04; B60L 2250/12; B60L 2250/22; B60L 2250/26; B60L 53/30; B60L 53/60; B60W 10/06; B60W 10/30; B60W 2540/06; B60W 30/18054; B60W 10/08; B60Y 2300/45; B60Y 2302/07; E05B 77/48; E05B 81/77; E05B 19/0082; E05B 49/00; E05B 81/54; G06F 17/00; H04B 1/3816; H04L 63/0853; H04L 63/0492; H04L 63/062; H04L 63/107; H04L 63/108; H04L 63/18; H04L 63/0861; H04L 67/125; Y02T 10/7005; Y02T 10/7072; Y02T 90/121; Y02T 90/128; Y02T 90/14; Y02T 90/163; G01C 21/3688; G01S 13/0209; G01S 5/04; G06K 9/00221; G06K 9/00228; G06K 9/00255; G06K 9/00791; G06K 9/00288; G08C 17/02; G08C 2201/93; H04Q 9/00; H04W 12/08; H04W 12/003; H04W 12/00503; H04W 12/00508; H04W 12/04; H04W 12/06; H04W 48/04; H04W 4/023; H04W 4/30; H04W 4/48; H04W 4/80; H04M 11/00; H04M 1/00
See application file for complete search history.

(56) References Cited

U.S. PATENT DOCUMENTS

| | | | |
|---|---|---|---|
| 2014/0240091 A1* | 8/2014 | Talty | G07C 9/00309 340/5.62 |
| 2014/0253287 A1* | 9/2014 | Bauman | G07C 9/00309 340/5.61 |
| 2014/0277837 A1 | 9/2014 | Hatton | |
| 2015/0002265 A1* | 1/2015 | Warschat | B60R 16/02 340/5.64 |
| 2015/0029010 A1* | 1/2015 | Wisnia | G08C 17/02 340/426.17 |
| 2015/0105994 A1 | 4/2015 | Geissenhoener | |
| 2015/0371472 A1 | 12/2015 | Kamiya | |
| 2018/0178758 A1* | 6/2018 | Yamaguchi | B60R 25/24 |
| 2019/0220001 A1* | 7/2019 | Lavoie | B60W 30/06 |

FOREIGN PATENT DOCUMENTS

| | | |
|---|---|---|
| DE | 102009033427 A1 | 3/2010 |
| DE | 102011011697 A1 | 12/2011 |
| DE | 102012204673 A1 | 9/2012 |
| DE | 102014101086 A1 | 7/2015 |
| DE | 102014107186 A1 | 11/2015 |
| DE | 102014112849 A1 | 3/2016 |
| EP | 1336939 A2 | 8/2003 |
| EP | 2942760 A1 | 11/2015 |
| JP | 2015055107 A | 3/2015 |
| WO | 2013072471 A1 | 5/2013 |
| WO | 2014091654 A1 | 6/2014 |
| WO | 2014159873 A1 | 10/2014 |

OTHER PUBLICATIONS

Office Action dated Apr. 2, 2019 in corresponding Korean Application No. 10-2019-7005180; 6 pages.
Office Action dated Jul. 16, 2019 in corresponding Chinese Application No. 201780048173.2; 9 pages.
Examination Report dated Mar. 23, 2017 of corresponding German application No. 10 2016 214 365.4; 10 pages including Partial Machine-generated English-language translation.
International Search Report and Written Opinion of the International Searching Authority dated Sep. 28, 2017 in corresponding International application No. PCT/EP2017/065270; 27 pages.

* cited by examiner

METHOD FOR OPERATING A START AND ENTRY SYSTEM OF A MOTOR VEHICLE AND START AND ENTRY SYSTEM FOR A MOTOR VEHICLE

FIELD

The invention relates to a method for operating a start and entry system of a motor vehicle and to a start and entry system for a motor vehicle.

BACKGROUND

So-called keyless start and entry systems for motor vehicles are known per se. In such systems, a user only needs to carry a key that comprises a transmitting and receiving unit in order to gain access to his vehicle and can then usually start the motor of the vehicle by actuating a start/stop button. The motor vehicle in such cases therefore does not have to be actively unlocked and it is not necessary to insert and turn a key in an ignition lock of the motor vehicle. Furthermore, start and entry systems for motor vehicles are known, in which a motor vehicle can be unlocked, locked and started by means of a Smartphone, in particular via near-field communication between Smartphone and motor vehicle.

DE 10 2014 107 186 A1 discloses a modular unit having an interface for a communication device which can be a Smartphone, for example. The modular unit is suitable for receiving signals of a communication module on the vehicle side via a wireless connection and to make the signals available to the communication terminal.

DE 10 2014 112 849 A1 discloses a method for remote control of at least a first function of a security device of a vehicle. For the remote control of this at least one function, a remote control device, for example, in the form of a Smartphone, is proposed. Without active operation of the remote control device, it is possible to unlock the vehicle, for example, just by touching an exterior handle of a door.

In addition, as long as the remote control device is in the vehicle interior, it is also possible to start the vehicle via a start-stop button in the vehicle interior, without having to insert a vehicle key into an ignition lock.

In addition, DE 10 2014 101 086 A1 discloses a mobile communication device in the form of a Smartphone, by means of which a motor vehicle can be unlocked, locked, and keylessly started via a near-field communication.

In particular, when a motor vehicle can be unlocked, locked and started via an NFC-capable, that is to say near-field communication-capable, communication device, for example, in the form of a Smartphone, as well as by means of a vehicle key comprising a transmitting and receiving unit, undesired side effects can sometimes occur. For example, functional limitations or unauthorized ads in a display device of the motor vehicle, such as, for example, an instrument cluster, for example, could arise. In addition, disadvantages can also result in terms of energy consumption when the two systems, that is to say the systems for near-field communication and for communication with the transmitting and receiving unit of the vehicle key, are continuously active.

SUMMARY

Therefore, the aim of the present invention is to provide a method for operating a start and entry system of a motor vehicle, and a start and entry system for a motor vehicle, by means of which a problem-free mode of operation of the start and entry system is made possible, with simultaneous usability of a near-field communication system and of a vehicle key comprising a transmitting and receiving unit.

This aim is achieved by a method for operating a start and entry system of a motor vehicle and by a start and entry system for a motor vehicle having the features of disclosure.

The method according to the invention for operating a start and entry system of a motor vehicle comprises detecting whether an authorization of the starting of the motor vehicle has occurred on the basis of a key signal received on-board the vehicle, which has been sent from a transmitting and receiving unit of a vehicle key, or whether the authorization of the starting of a vehicle has occurred on the basis of a near-field signal received on-board the vehicle, which has been sent out by a near-field communication system of a mobile communication device. In other words, a determination is thus made as to whether, in particular after actuation of a start-stop button of the motor vehicle, an ignition of the motor vehicle has been activated or a motor of the motor vehicle has been started, because either the authorization has been brought about by means of an NFC-capable communication device, for example, in the form of a Smartphone, or by means of a vehicle key comprising a transmitting and receiving unit. In a starting of the vehicle, two systems of the motor vehicle are thus queried, namely, on the one hand, the NFC system for the communication with the near-field communication system, and, on the other hand, a key reading device for the communication with the transmitting and receiving unit of the key. Thereby, it is clear whether the starting of the vehicle has occurred by an NFC communication or by a communication with the transmitting and receiving unit of the vehicle key.

If the authorization of the starting of the vehicle has occurred on the basis of the key signal received on-board the vehicle, the start and entry system is operated in a key operating mode, in which, after the starting of the vehicle, only the availability of the vehicle key in a vehicle interior of the motor vehicle is being monitored. On the other hand, if the authorization of the starting of the vehicle has occurred on the basis of the near-field signal received on-board the vehicle, the start and entry system is operated in a near-field operating mode, in which, after the starting of the vehicle, only the availability of the mobile communication device comprising a near-field communication system is being monitored in the vehicle interior.

Here, it is possible to provide that, both in the key operating mode and in the near-field operating mode, the respective searches for the vehicle key and for the mobile communication device in the vehicle interior are only started as soon as a predetermined condition is satisfied, for example, after the door of the motor vehicle has been opened. Thereby, energy can be saved.

The actuation of an ignition start button, for example, of a start-stop button, signals the driver's wish to start and at the same time starts the search for the vehicle key comprising the transmitting and receiving unit, also referred to as a keyless key, or for the mobile communication device comprising the near-field communication system, for example, in the form of an NFC-capable Smartphone. The device, that is to say the key or the communication device, which has been authorized first defines the next operating mode, that is to say whether the start and entry system is operated in said key operating mode or in said near-field operating mode. If the two systems report simultaneously, that is to say both the transmitting and receiving unit of the vehicle key and also the near-field communication system of the mobile communication device, then a prioritization can optionally be carried out, for example, in such a way that the vehicle key is prioritized, as a result of which the start and entry system is operated in said key operating mode.

In that, according to the invention, a distinction between the key operating mode and the near-field operating mode, energy can be saved correspondingly, since only the search either for the vehicle key comprising the transmitting and receiving unit or for the mobile communication device comprising the near-field communication system is necessary. Indeed, if, after the starting of the vehicle, the vehicle key or the communication device were removed from the vehicle interior, after the starting of the vehicle has been brought about by means of the vehicle key or by means of the communication device, the driver should be notified of these circumstances, since in the absence of the vehicle key or of the communication device after the motor has been switched off, he would normally no longer be able to start the motor. By means of the method according to the invention, with reduced energy consumption, it is nevertheless ensured that the driver is informed in a timely manner about the circumstance, when, due to a removal of the vehicle key or of the communication device from the vehicle interior, a new starting of the motor of the motor vehicle could be problematic.

An advantageous embodiment of the invention provides that the start and entry system is operated in a combined operating mode, in which a continuous search is carried out for the vehicle key or the mobile communication device in the vehicle interior as soon as the vehicle key, in the key operating mode, or the mobile communication device, in the near-field operating mode, is no longer detected in the vehicle interior. This combined operating mode is thus active or activated as soon as the device that has determined the key operating mode or the near-field operating mode earlier, that is to say the vehicle key or the communication device, is no longer detected in the vehicle interior. In the combined operating mode, a search both for the vehicle key and for the communication device is conducted continuously, that is to say cyclically. Here, the invention is based on the finding that, during a car ride, situations can certainly arise in which the vehicle key or the communication device is removed from the motor vehicle interior.

An additional advantageous embodiment of the invention provides that, if, after a predetermined search duration in the combined operating mode, neither the vehicle key nor the mobile communication device is detected in the vehicle interior, the search for the vehicle key or for the mobile communication device is interrupted until the occurrence of a predetermined search condition such as, for example, the opening of one or more vehicle doors. Alternatively, it is also possible that the search for the vehicle key or for the mobile communication device is discontinued or interrupted after a predetermined number of searches until the predetermined search condition has been met. Thereby, after an unsuccessful search for the vehicle key or for the mobile communication device, energy can be saved until it again becomes more likely that the vehicle key and/or the mobile communication device are detected in the vehicle interior during the search.

In another advantageous design of the invention, it is provided that the combined operating mode is terminated and that the start and entry system is operated in the key operating mode as soon as the vehicle key has been detected in the vehicle interior in the combined operating mode. Indeed, as soon as the vehicle key has been detected in the vehicle interior, the key operating mode can occur without problem, since it is sufficient in this case to monitor that the vehicle key does not leave the vehicle interior.

In this connection, it is preferably provided that, if the start and entry system has been operated in the near-field operating mode before the switch to the combined operating mode, the switch of the operating mode to the key operating mode is displayed by means of a display device in the motor vehicle. Thereby, the driver of the motor vehicle recognizes in particular that, although he started his motor vehicle on the basis of a near-field communication, now just the key has been detected in the motor vehicle interior and that he should always carry this key with him if he would like to be able to start the motor again after the motor of the motor vehicle has been turned off. An additional advantageous embodiment of the invention provides that the combined operating mode is terminated and that the start and entry system is operated in the near-field operating mode as soon as the mobile communication device has been detected in the vehicle interior in the combined operating mode. In this case it is sufficient to monitor whether, during the car ride, the mobile communication device does not leave the vehicle interior, since otherwise, after the motor has been switched off, a new starting of the motor would not be possible, at least as long as the driver does not also still carry the vehicle key with him.

In this connection, it is preferably provided that, if the start and entry system is operated in the key operating mode before the switch to the combined operating mode, the switch of the operating mode to the near-field operating mode is displayed by means of the display device in the motor vehicle. Thereby, the driver of the motor vehicle is informed that he should at least not lose the mobile communication device and always carry it with him, since otherwise he can no longer start the motor of the motor vehicle, at least if he can no longer find the vehicle key.

According to another advantageous embodiment of the invention, it is provided that, as long as neither the vehicle key nor the mobile communication device is detected in the vehicle interior in the combined operating mode, a display is provided by means of the display device in the motor vehicle indicating that neither the vehicle key nor the mobile communication device is located in the vehicle interior, and that the combined operating mode is being maintained. Alternatively, it is also possible that the display of the message that neither the vehicle key nor the mobile communication device is located in the motor vehicle interior occurs only after a predetermined search duration in the combined operating mode has been exceeded or after a predetermined number of search attempts in the combined operating mode has been exceeded. The driver is thus informed of the circumstance that neither the vehicle key nor the mobile communication device is located in the vehicle interior, so that he would no longer be able to start the motor after switching off of the motor of the motor vehicle unless he were again to gain access to the vehicle key or to the mobile communication device.

The inventive start and entry system for a motor vehicle comprises a detection device which is designed to detect whether an authorization of a starting of the motor vehicle has occurred on the basis of a key signal received on-board the vehicle, which has been sent by a transmitting and receiving unit of a vehicle key, or whether the authorization of the starting of the vehicle has occurred on the basis of a near-field signal received on-board the vehicle, which has been sent out by a near-field communication system of a mobile communication device. Moreover, the start and entry system according to the invention comprises a control device which is designed to operate the start and entry system in a key operating mode, in which, after the starting of the vehicle, only the availability of the vehicle key in the vehicle interior of the motor vehicle is being monitored, if the authorization of the starting of the vehicle has occurred on the basis of a key signal received on-board the vehicle. In addition, the control device is designed to operate the start and entry system in a near-field operating mode, in which, after the starting of the vehicle, only the availability of the mobile communication device in the vehicle interior is being monitored, if the authorization of the starting of the vehicle has occurred on the basis of a near-field signal received on-board the vehicle. Advantageous designs of the method according to the invention should be considered to be advantageous designs of the start and entry system according to the invention, wherein the start and entry system comprises in particular means for carrying out the method steps.

The motor vehicle according to the invention comprises the start and entry system according to the invention or an advantageous embodiment of the start and entry system according to the invention.

BRIEF DESCRIPTION OF THE DRAWINGS

Additional advantages, features and details of the invention result from the following description of preferred embodiment examples and in reference to the drawing. The features and combinations of features mentioned above in the description and the features and combinations of features mentioned below in the description of the figures and features and combinations of features shown only in the figures can be used not only in the respective indicated combination but also in other combinations or alone, without leaving the scope of the invention.

DETAILED DESCRIPTION

Figure 1:
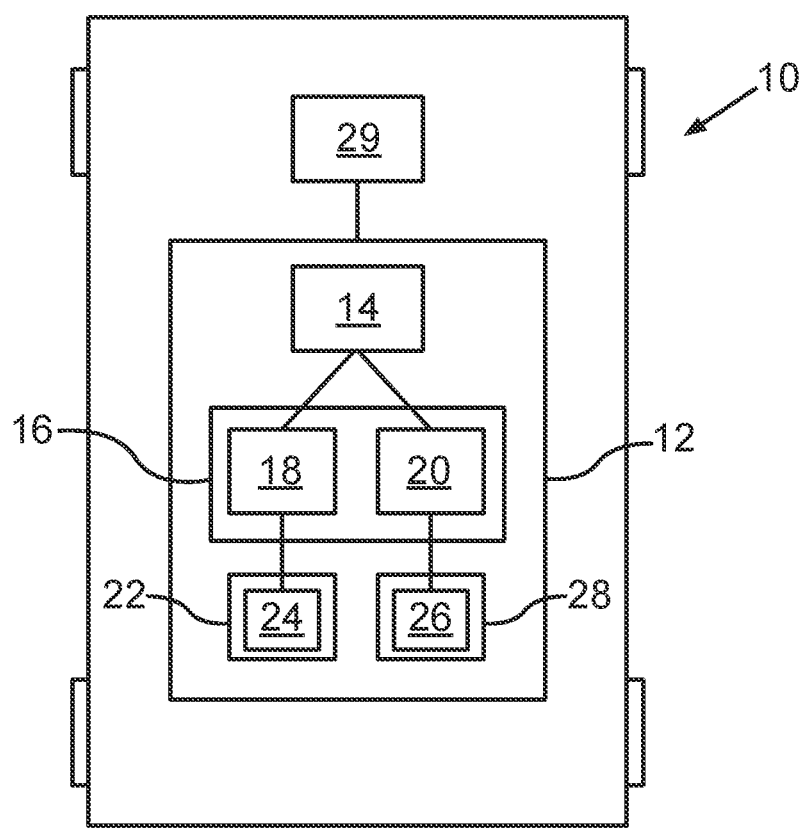
Figure 2:
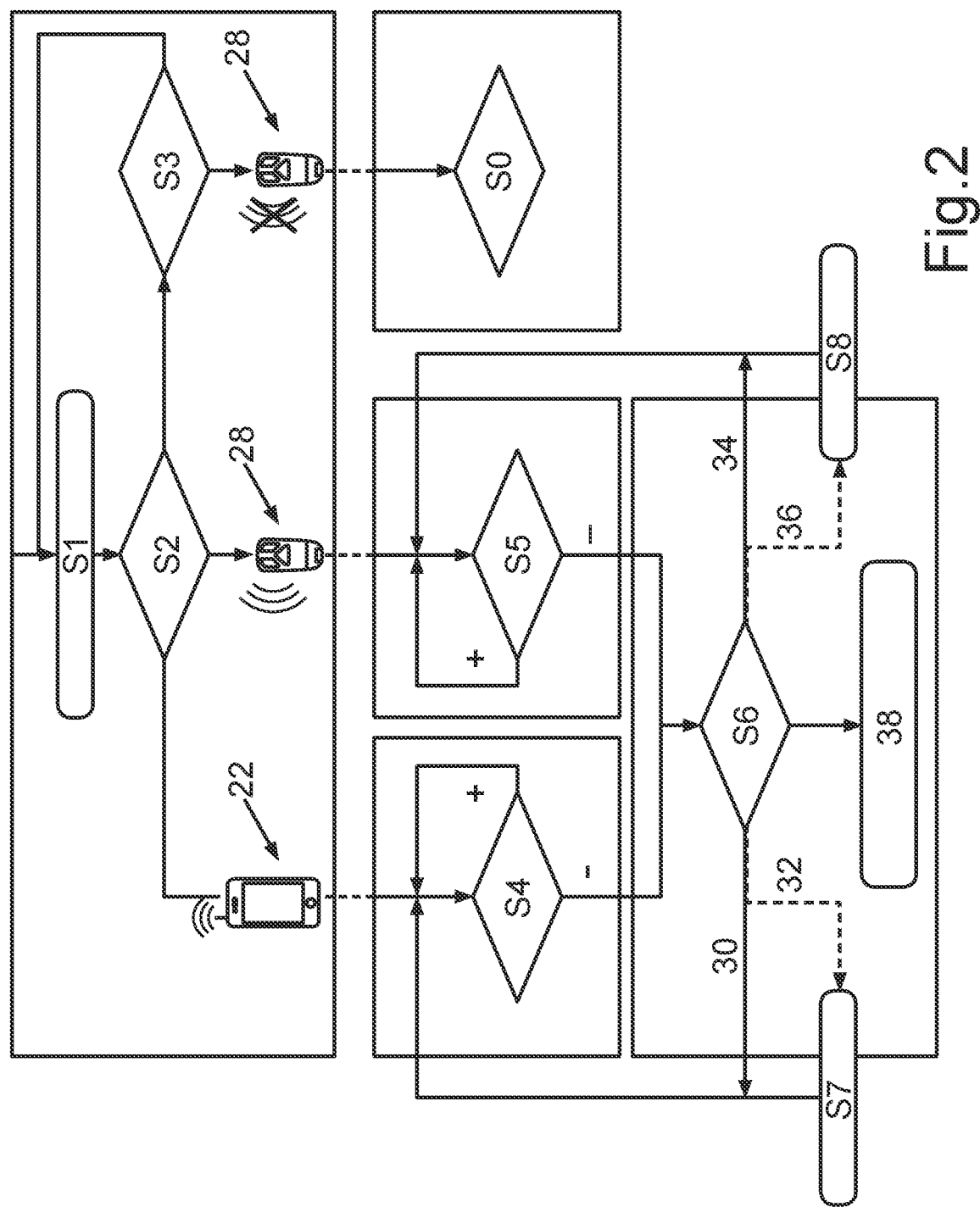

The drawing shows, in:

FIG. 1 a diagrammatic representation of a motor vehicle, with a start and entry system which can be controlled both by means of a vehicle key comprising a transmitting and receiving unit and also by means of a near-field communication-capable Smartphone, in order to gain access to the motor vehicle and also start said motor vehicle; and in FIG. 2 a flowchart which describes a search and display strategy of the start and entry system of the motor vehicle.

A motor vehicle 10 with a start and entry system 12 is shown in a diagrammatic representation in FIG. 1. The start and entry system 12 comprises a control device 14, a detection device 16 with an NFC reading device 18 and with a key reading device 20, a Smartphone 22 with a near-field communication system 24, and a vehicle key 28 comprising a transmitting and receiving unit 26. The start and entry system 12 is a so-called keyless start and entry system. It is keyless because a user does not have to actively use a key for unlocking, locking and starting the motor of the motor vehicle 10.

If he wishes to unlock the motor vehicle 10, he merely has to carry the vehicle key 28 with him and, for example, touch a door handle of the motor vehicle 10. For this purpose, the motor vehicle 10 can have, for example, a capacitive sensor on the door handle. As soon as an approach to the door handle or contact with the door handle has been detected by means of the capacitive sensor, the key reading device 20 sends a query signal to the transmitting and receiving unit 26 of the vehicle key 28. If the transmitting and receiving unit 26 is in an appropriate range, it receives the query signal, decodes it and resends a signal with a new coding. In the motor vehicle 10, this signal is decoded again and, in the case of a successful authentication, an unlocking of the motor vehicle 10 is authorized.

In the same way, the user can also hold his Smartphone 22, for example, close to the door handle of the motor vehicle 10, as a result of which, in the same way, a communication between the NFC reading device 18 and the near-field communication system 24 on the smartphone side is carried out.

As soon as the user has taken a seat in the motor vehicle 10, he can press a start-stop button, not represented here, as a result of which a verification is carried out as to whether the vehicle key 28 and/or the Smartphone 22 is/are located in the vehicle interior. If at least one of the two devices 22, 28 is located in the vehicle interior, then, after actuation of the start-stop button, the motor of the motor vehicle 10 is activated.

However, the fact that the user can unlock and lock the motor vehicle 10 and start the motor of the motor vehicle 10 both by means of the Smartphone 22 and by means of the vehicle key 28 comprising the transmitting and receiving unit 26 does not only entail advantages. During the ride with the motor vehicle 10, it must be ensured that at least either the Smartphone 22 or the vehicle key 28 has furthermore been taken along by the driver. For example, if a passenger steps out of the motor vehicle 10 when the motor is running and takes both the Smartphone 22 and the vehicle key 28 with him, then the driver would no longer be able to start the motor vehicle after the motor of the motor vehicle 10 has been switched off. Therefore, it is important that the driver be informed, for example by an appropriate control of an instrument cluster 29 by means of the control device 14, as to how the motor vehicle 10 has been started and/or whether the Smartphone 22 or the vehicle key 28 has just been removed from the vehicle interior.

In FIG. 2, a diagram is represented, which describes in further detail a search and display strategy of the start and entry system 12. Shown first by S1 is the method step in which the driver actuates the start-stop button. This results in a verification in a method step S2 to determine whether a vehicle start of the motor vehicle 10 has occurred on the basis of the above-described communication via the Smartphone 22 by near-field communication or via the transmitting and receiving unit 26 of the vehicle key 28. If, after the actuation of the start-stop button, no answer from the Smartphone 22 side and no answer on the vehicle key 28 side has arrived, then the driver is requested in method step S3 to hold the vehicle key 28 close to a transponder coil on the vehicle side, in order to start the motor vehicle 10. This can be necessary, for example, when a battery of the vehicle key 28 is flat, and, as a result, the transmitting and receiving unit 26 can no longer be supplied with current. In order to nevertheless be able to start the motor vehicle 10 in such a case, the vehicle key 28 additionally has a transponder which is not represented in further detail. As soon as the vehicle key 28 is held close to the transponder coil on the vehicle side, a voltage is induced in the transponder, as a result of which it can also send the key signal necessary for the starting of a motor vehicle 10.

If the authorization of the starting of the vehicle has occurred on the basis of the key signal received on-board the vehicle by the transponder, the start and entry system 12 is operated by means of the control device 14 in a transponder mode S0. In the transponder mode S0 it can be provided that, after the starting of the vehicle, at first the availability of neither the vehicle key 28 nor of the Smartphone 22 in a vehicle interior of the motor vehicle 10 is being monitored. However, as soon as a predetermined search condition such as, for example, the opening of a vehicle door, has been detected, it can be provided that a search is carried out in the vehicle interior for an additional vehicle key with transmitting and receiving unit, which is set up for authorizing the starting of the vehicle, and/or for the Smartphone 22 which is set up for authorizing the vehicle start. If the Smartphone 22 is found, a switch to the method step S4 occurs, wherein, if the additional vehicle key is found, a switch to method step S5 occurs.

If the authorization of the starting of the vehicle has occurred on the basis of a signal received, on the vehicle side, by the Smartphone 22, more precisely by the near-field communication system 24 of the Smartphone 22, the start and entry system 12 is operated by means of the control device 14 in a near-field operating mode S4, in which, after the starting of the vehicle, only the availability of the Smartphone 22 in the vehicle interior is being monitored. As long as it is detected that the Smartphone 22 is located in the vehicle interior, which in the present case is indicated by the plus symbol, the start and entry system 12 remains in the near-field operating mode S4.

On the other hand, if it has been detected during method step S2 that the authorization of the starting of the vehicle has occurred on the basis of the key signal received on-board the vehicle from the transmitting and receiving unit 26 of the vehicle key 28, the control device 14 operates the start and entry system 12 in a key operating mode S5, in which, after the starting of the vehicle, only the availability of the vehicle key 28 in the vehicle interior is being monitored. As soon as, in the key operating mode S5, the vehicle key 28 is detected in the vehicle interior, marked by a plus symbol, the key operating mode is being maintained by the control device 14.

The start and entry system 12 is switched by means of the control device 14 to a combined operating mode S6, in which a continuous search is carried out for the vehicle key 28 and for the Smartphone 22 in the vehicle interior, as soon as the vehicle key 28, in the key operating mode S5, or the Smartphone 22, in the near-field operating mode S4, is no longer detected in the vehicle interior, marked by a minus symbol in the diagram.

During the operation of the start and entry system 12 in the combined operating mode S6, a plurality of different possibilities exist for operating the start and entry system 12. A first possibility 30 is that, coming from the near-field operating mode S4, in the combined operating mode S6, the Smartphone 22 is found again in the vehicle interior. In this case, the combined operating mode S6 is terminated, and the control device 14 then operates the start and entry system 12 again in the near-field operating mode S4.

An additional possibility 32 is that, coming from the key operating mode S5, in the combined operating mode S6, the Smartphone 22 is detected in the vehicle interior, but the vehicle key 28 is not found. In this case, the combined operating mode S6 is also terminated, and the near-field operating mode S4 is started, wherein, in an additional method step S7, in the instrument cluster 29 of the motor vehicle 10, it is indicated that the switch from the initial key operating mode S5 to the near-field mode S4 has been carried out.

In particular the driver of the motor vehicle 10 can thereby recognize that, although he has started his motor vehicle 10 by means of the vehicle key 28 comprising the transmitting and receiving unit 26, the vehicle key 28 is, however, no longer in the vehicle interior, and therefore he should in particular take care not to remove the Smartphone 22 as well from the vehicle interior. Indeed, as long as he carries the Smartphone 22 with him he can start the motor again via the already described near-field communication even after switching off the motor of the motor vehicle 10.

An additional possibility 34 is that, in the combined operating mode S6, coming from the key operating mode S5, the vehicle key 28 is again detected in the vehicle interior. In this case, the combined operating mode S6 is terminated, and the start and entry system 12 is again switched to the key operating mode S5.

The possibility 36 describes the case in which, in the combined operating mode S6, coming from the near-field operating mode S4, the vehicle key 28 can in fact be detected, but the Smartphone 22 by means of which, via the near-field communication, the starting of the vehicle has been initiated cannot be detected. In this case, the combined operating mode S6 is also terminated, and the start and entry system 12 is switched to the key operating mode S5. Moreover, in an additional method step S8, the driver is again informed by means of the instrument cluster 29 that a switch of the operating mode to the key operating mode S5 has occurred. Thus, in method step S8, the driver of the motor vehicle 10 is informed that, although he authorized initially a start of the motor vehicle 10, more precisely of the motor, via near-field communication using his Smartphone 22, the Smartphone 22 is no longer located in the vehicle interior. Instead however, the vehicle key 28 with the transmitting and receiving unit 26 is still located in the vehicle interior, so that the driver is alerted to the fact that he should not lose the vehicle key 28 as well or that he should continue to carry said vehicle key with him if he wishes to be able to start the motor again after the motor has been turned off.

In addition, there is another possibility 38, namely that, in the combined operating mode S6, neither the Smartphone 22 nor the vehicle key 28 is detected in the vehicle interior. In this case, the driver is informed of this circumstance by an appropriate display in the instrument cluster 29, so that the driver is thereby informed that he will no longer be able to activate the motor after turning off the motor of the motor vehicle 10 unless he again procures the Smartphone 22 and/or the vehicle key 28.

By means of the explained method for operating the start and entry system 12, a driver is thus reliably and specifically informed of a loss of the vehicle key 28 or of the near-field communication-capable Smartphone 22. In addition, a switch between the key operating mode S5 and the near-field operating mode S4 is identified and displayed for the driver by means of an appropriate overlay in the instrument cluster 29. The energy consumption of the motor vehicle 10 can be optimized by the described control of the start and entry system 12, since it is not necessary to conduct a continuous search both for the Smartphone 22 and for the vehicle key 28, at least as long as the Smartphone 22 is detected in the near-field operating mode S4 or the vehicle key 28 is detected in the key operating mode S5 in the vehicle interior.

The invention claimed is:

1. A method for operating a start and entry system of a motor vehicle, comprising the steps of:
 detecting whether an authorization of the starting of the motor vehicle has occurred on the basis of a key signal received on-board the vehicle, which has been sent from a transmitting and receiving unit of a vehicle key, or whether the authorization of the starting of the vehicle has occurred on the basis of a near-field signal received on-board the vehicle, which has been sent out by a near-field communication system of a mobile communication device;

if the authorization of the starting of the vehicle has occurred on the basis of the key signal received on-board the vehicle: operating the start and entry system in a key operating mode, in which, following the starting of the vehicle, only the availability of the vehicle key in a vehicle interior of the motor vehicle is being monitored;

if the authorization of the starting of the vehicle has occurred the basis of the near-field signal received on-board the vehicle: operating the start and entry system in a near-field operating mode in which, following the starting of the vehicle, only the availability of the mobile communication device in the vehicle interior is being monitored, wherein the start and entry system is operated in a combined operating mode, in which a search for the vehicle key and the mobile communication device is carried out continuously in the vehicle interior as soon as the vehicle key, in the key operating mode, or the mobile communication device, in the near-field operating mode, is no longer detected in the vehicle interior.

2. The method according to claim 1, wherein if, after a predetermined search duration in the combined operating mode, neither the vehicle key nor the mobile communication device are detected in the vehicle interior, the search for the vehicle key and for the mobile communication device is interrupted until a predetermined search condition occurs.

3. The method according to claim 1, wherein the combined operating mode is terminated and the start and entry system is operated in the key operating mode as soon as the vehicle key has been detected in the vehicle interior in the combined operating mode.

4. The method according to claim 3, wherein if the start and entry system has been operated in the near-field operating mode before the switch to the combined operating mode, the switch of the operating mode to the key operating mode is displayed by a display device in the motor vehicle.

5. The method according to claim 1, wherein the combined operating mode is terminated and the start and entry system is operated in the near-field operating mode as soon as the mobile communication device has been detected in the vehicle interior in the combined operating mode.

6. The method according to claim 5, wherein if the start and entry system has been operated in the key operating mode before the switch to the combined operating mode, the switch of the operating mode to the near-field operating mode is displayed by the display device in the motor vehicle.

7. The method according to claim 1, wherein as long as neither the vehicle key nor the mobile communication device is detected in the vehicle interior in the combined operating mode, a display is provided by means of the display device in the motor vehicle, indicating that neither the vehicle key nor the mobile communication device is located in the vehicle interior and that the combined operating mode is being maintained.

8. A start and entry system for a motor vehicle, comprising:

a detection device which is designed to detect whether an authorization of a starting of the motor vehicle has occurred on the basis of a key signal received on-board the vehicle, which has been sent by a transmitting and receiving unit of a vehicle key, or whether the authorization of the starting of the vehicle has occurred on the basis of a near-field signal received on-board the vehicle, which has been sent out by a near-field communication system of a mobile communication device;

a control device which is designed to operate the start and entry system in a key operating mode, in which, after the starting of the vehicle, only the availability of the vehicle key in a vehicle interior of the motor vehicle is being monitored, if the authorization of the starting of the vehicle has occurred on the basis of a key signal received on-board the vehicle, and to operate the start and entry system in a near-field operating mode, in which, after the starting of the vehicle, only the availability of the mobile communication device in the vehicle interior is being monitored, if the authorization of the starting of the vehicle has occurred on the basis of a near-field signal received on-board the vehicle, wherein control device is further designed to operate the start and entry system in a combined operating mode, in which a search for the vehicle key and the mobile communication device is carried out continuously in the vehicle interior as soon as the vehicle key, in the key operating mode, or the mobile communication device, in the near-field operating mode, is no longer detected in the vehicle interior.

* * * * *